United States Patent
Naraki et al.

[11] Patent Number: 5,770,633
[45] Date of Patent: Jun. 23, 1998

[54] PROCESS FOR REGENERATING CROSS-LINKED, VULCANIZED FLOURINE RUBBER

[75] Inventors: Akihiro Naraki; Fumiyo Mizuide, both of Kitaibaraki; Haruyoshi Tatsu, Hitachi, all of Japan

[73] Assignee: Nippon Mektron, Limited, Tokyo, Japan

[21] Appl. No.: 684,272

[22] Filed: Jul. 17, 1996

[30] Foreign Application Priority Data

Jul. 19, 1995 [JP] Japan ............ 7-205177

[51] Int. Cl.$^6$ ............ C08J 11/04
[52] U.S. Cl. ............ 521/43; 521/46
[58] Field of Search ............ 521/47, 46

[56] References Cited

U.S. PATENT DOCUMENTS

| | | | |
|---|---|---|---|
| 3,291,761 | 12/1966 | Griffin | 521/46 |
| 3,793,235 | 2/1974 | Goebel | 521/46 |
| 3,972,842 | 8/1976 | Markham | 521/46 |

FOREIGN PATENT DOCUMENTS

| | | |
|---|---|---|
| 2 360 927 | 6/1974 | Germany . |
| 2 420 993 | 11/1974 | Germany . |
| 59-217734 | 12/1984 | Japan . |
| 59-217735 | 12/1984 | Japan . |

OTHER PUBLICATIONS

Kautschuk + Gummel—Kunststoffe 23. Jahrgang, Heft 3/1976, p. 218.

Recycling—Special Elastomers Flourine Rubbers, Pu Elastomers, Kautschuk and Gummel Kunststoppe 45, Jahrgang, Nr 9/92, pp. 742–746.

Proiz–vo Shi, Rezinotekhn, Asbestotekhn Izdii, (Moskva) 1979 vol. 6, p. 7.

*Primary Examiner*—Karen A. Dean
*Attorney, Agent, or Firm*—Kenyon & Kenyon

[57] ABSTRACT

Filler-containing, cross-linked, vulcanized fluorine rubber waste is regenerated by treatment with at least one of $CH_3SO_3H$, $ClSO_3H$, $CF_3SO_3H$ and fuming sulfuric acid, followed by dissoluting into a solvent and separating solvent-insoluble filler therefrom, whereby revulcanizable fluorine rubber is recovered from the fluorine rubber waste, almost irrespective of types of cross-linking systems used for formation of cross-linked, vulcanized fluorine rubber.

11 Claims, No Drawings

PROCESS FOR REGENERATING CROSS-LINKED, VULCANIZED FLOURINE RUBBER

BACKGROUND OF THE INVENTION

1. Field of the Invention

The present invention relates to a process for regenerating cross-linked, vulcanized fluorine rubber, and more particularly a process for regenerating cross-linked, vulcanized fluorine rubber to recover revulcanizable fluorine rubber from the cross-linked, vulcanized fluorine rubber wastes.

2. Related Prior Art

Utilization of ordinary rubber wastes by regeneration has no positive cost merits, but utilization of vulcanized fluorine rubber wastes, typical of which are flashes generated during the rubber vulcanization-molding, is an important task from the viewpoint of cost reduction, because the high raw material cost of fluorine rubber.

So far, the cross-linked, vulcanized fluorine rubber has been regenerated by mechanically pulverizing flashes, waste pieces, etc. of the cross-linked, vulcanized fluorine rubber, followed by plasticing, or by further treatment with nitric acid, potassium permanganate or various amines [JP-A 59-217734 and 59-217735; U.S. Pat. No. 3,291,761; DP-A 2 360 927 and 2 420 993; Kautschuk+Gummel·Kunststoffe 23. Jahrgang, Heft 3/1976, page 218 and ibid. 45. Jahrgang, Nr. 9/92, page 742; Proiz-vo Shin, Rezinotekhn; Asbesto-tekhn. Izdlii (Moskva) 1979, vol. 6, page 7]. The regenerated fluorine rubber is mixed with virgin rubber (fresh rubber) as a filler and is used as a kind of extender.

However, the cross-linking structure of the cross-linked, vulcanized fluorine rubber must be decomposed to obtain the regenerated fluorine rubber from the cross-linked, valcanized fluorine rubber. Furthermore, the vinylidene fluoride structure of vinylidene fluoride copolymer usually used in the fluorine rubber is actually hard to decompose under basic conditions or the cross-linking structure based on polyhydroxy compound (polyol) is not so decomposed even with a strong acid such as nitric acid, etc. as to regenerate and isolate the rubber moiety.

Still furthermore, the cross-linked, vulcanized fluorine rubber contains a filler in almost all the cases, and it is desirable to obtain regenerated fluorine rubber completely freed from such a filler. It is pointed out that the above-mentioned regeneration procedure is not always applicable, depending on the cross-linking system used for the formation of cross-linked, vulcanized fluorine rubber, and thus is not generally applicable.

SUMMARY OF THE INVENTION

An object of the present invention is to provide a process for regenerating cross-linked, vulcanized fluorine rubber, which is capable of recovering revulcanizable fluorine rubber from the vulcanized fluorine rubber waste, almost irrespective of the types of cross-linking systems used for the formation of cross-linked, vulcanized fluorine rubber.

According to the present invention, there is provided a process for regenerating cross-linked, vulcanized fluorine rubber, which comprises treating cross-linked, vulcanized fluorine rubber with $CH_3SO_3H$, $ClSO_3H$, $CF_3SO_3H$ or fuming sulfuric acid, thereby recovering the treated fluorine rubber as revulcanizable fluorine rubber.

DETAILED DESCRIPTION OF THE INVENTION

Waste of cross-linked, vulcanized fluorine rubber for use in the regeneration procedure of the present invention includes, for example, flashes, waste pieces, poor moldings, etc. generated from the vulcanization-molding of fluorine rubber with polyol, amine, peroxide or the like.

The fluorine rubber for use in the vulcanization-molding includes copolymers of vinylidene fluoride with at least one of other fluorine-containing olefins or olefins, such as tetrafluoroethylene, hexafluoropropene, chlorotrifluoroethylene, pentafluoropropene, perfluoro(alkyl vinyl ether), propylene, etc., typical of which are a vinylidene fluoride-hexafluoropropene copolymer, a vinylidene fluoride-hexafluoropropene-tetrafluoroethylene terpolymer, a vinylidene fluoride-tetra-fluoroethylene-propylene terpolymer, a vinylidene fluoride-perfluoro(methyl vinyl ether) copolymer, a vinylidene fluoride-tetrafluoroethylene-perfluoro(methyl vinyl ether) terpolymer, etc. Besides, tetrafluoroethylene copolymers such as a tetra-fluoroethylene-propylene copolymer, a tetrafluoroethylene-perfluoro (methyl vinyl ether) copolymer, a tetrafluoroethylene-perfluoro(methyl vinyl ether)-ethylene terpolymer, etc. can be also used in the present invention. These copolymers can be also used, as further copolymerized with a Br— and/or I— containing compound, or a monomer having such a cross-linkable group as a nitrile group, a glycidyl group, a hydroxyalkyl group, a perfluorophenyl group or the like.

Cross-linked, vulcanized fluorine rubber waste is added to about 0.5 to about 20-fold volumes of at least one of ultra strong acids such as $CH_3SO_3H$, $ClSO_3H$, $CF_3SO_3$ H, fuming sulfuric acid, etc. and treated therewith with heating and stirring. Heating temperature and treating time depend on the kind of the acid used, and are generally about 50° C. to about 200° C. and about 0.1 to about 100 hours, respectively. These acids are all expensive except the fuming sulfuric acid, and thus can be used, as diluted with a solvent inert to the reaction. The solvent for use for this purpose is preferable a solvent capable of swelling the cross-linked, vulcanized fluorine rubber such as ketones, amides (dimethyl formamide, dimethyl acetamide, etc.), sulfur-containing compounds (dimethyl sulfoxide, sulfolane, etc.), alcohols, lower fatty acids, esters, halogen-containing compounds (trichlorotrifluoroethane, hexafluoroisopropanol, trifluoroethanol, trichloroacetic acid, etc.), etc.

After the treatment, filtration, water washing, neutralization with an aqueous solution of sodium carbonate or sodium hydrogen carbonate or the like, water washing and drying of the treated fluorine rubber waste are carried out. The treated fluorine rubber waste contains the filler used in the vulcanization-molding, and thus the entire treated fluorine rubber waste may be added to a fluorine rubber-soluble solvent such as acetone, methyl ethyl ketone, tetrahydrofuran, acetate ester, etc. and then the filler is separated therefrom by an appropriate separating means such as centrifuge, filtration, etc., and the solution is concentrated to obtain the regenerated fluorine rubber. It is also possible to use the treated fluorine rubber waste, as it is, without separating the filler.

According to the present process, revulcanizable fluorine rubber can be ready recovered from the cross-linked, vulcanized fluorine rubber waste. The present process is applicable to any cross-linked, vulcanized fluorine rubber waste, irrespective of the kind of cross-linking systems used. The thus recovered, regenerated fluorine rubber, when mixted with virgin rubber (fresh rubber) even in an amount of about 5 to about 40% by weight on the basis of the virgin rubber, will not lower the physical properties of vulcanization products substantially, and is applicable to vulcanization-molding for various ordinary uses of fluorine rubber including use of sealing materials such as O-rings, packings, oil seals, etc.

PREFERRED EMBODIMENTS OF THE INVENTION

The present invention will be described in detail below, referring Examples, where parts are by weight, unless otherwise specially mentioned.

EXAMPLE 1

200 g of filler-containing, vulcanized vinylidene fluoride-hexafluoropropene copolymer rubber cross-linked with a polyol-based cross-linking agent and 1,800 g of $CH_3SO_3H$ were placed in a flask and stirred for 45 hours, while maintaining the inside temperature at 140° C. Finely pulverized treated product was subjected to filtration, water washing and drying, and then dissolved in 1,000 g of acetone and centrifuged at 10,000 rpm for 30 minutes, whereby the filler contained in the treated product was separated therefrom. The residual acetone solution was concentrated under reduced pressure, whereby 35 g of dark brown regenerated fluorine rubber A was recovered.

To 20 parts (by weight; and so on) of the thus obtained regenerated fluorine rubber A were added the following components:

| | |
|---|---|
| Vinylidene fluoride-hexafluoropropene copolymer rubber | 100 parts |
| MT carbon black | 20 parts |
| 2,2-bis(4-hydroxyphenyl)hexafluoropropane (50%) | 4.6 parts |
| Benzyltriphenylphosphonium chloride (35%) | 1.2 parts |
| Magnesium oxide | 3.5 parts |
| Calcium hydroxide | 7 parts |

The mixture was kneaded through a double roll, and then the kneaded product was subjected to press vulcanization (primary vulcanization) at 180° C. for 15 minutes and then to oven vulcanization (secondary vulcanization) at 200° C. for 24 hours. The thus obtained vulcanization product was subjected to determination of physical properties.

EXAMPLE 2

200 g of filler-containing, vulcanized vinylidene fluoride-hexafluoropropene copolymer rubber cross-linked with a polyol-based cross-linking agent and 800 g of $ClSO_3H$ were placed in a flask and stirred for one hours, while maintaining the inside temperature at 80° C. The resulting treated liquid slurry product was put into water to precipitate. Then, the resulting precipitate was recovered by filtration, washed with an aqueous solution of sodium hydrogen carbonate and then with water, and dried, whereby 168 g of filler-containing powder was obtained. Then, 100 g of the filler-containing powder was dissolved into 1,000 g of acetone and centrifuged at 10,000 rpm for 60 minutes to separate the filler contained in the treated material. The residual acetone solution was concentrated under reduced pressure, whereby 67 g of dark brown regenerated fluorine rubber B was recovered.

To 20 parts of the thus obtained regenerated fluorine rubber B were added the following components:

| | |
|---|---|
| Vinylidene fluoride-hexafluoropropene copolymer rubber | 100 parts |
| MT carbon black | 20 parts |
| 2,2-bis(4-hydroxyphenyl)hexafluoropropane (50%) | 4.6 parts |
| Benzyltriphenylphosphonium chloride (35%) | 1.2 parts |
| Magnesium oxide | 3.5 parts |
| Calcium hydroxide | 7 parts |

The mixture was kneaded through a double roll, and then the kneaded product was subjected to press vulcanization (primary vulcanization) at 180° C. for 15 minutes and then to oven vulcanization (secondary vulcanization) at 200° C. for 24 hours. The thus obtained vulcanization product was subjected to determination of physical properties.

EXAMPLE 3

122 g of filler-containing powder was obtained in the same manner as in Example 2, except that 400 g of fuming sulfuric acid was used in place of 800 g of $ClSO_3H$, and then 47 g of acetone-soluble, dark brown regenerated fluorine rubber C was obtained from 100 g of the powder.

To 20 parts of the regenerated fluorine rubber C were added the following components:

| | |
|---|---|
| Vinylidene fluoride-hexafluoropropene copolymer rubber | 100 parts |
| MT carbon black | 25 parts |
| Hexamethylenediamine carbamate | 1.7 parts |
| lead oxide | 17 parts |
| Dibasic lead phosphite | 5.7 parts |

The mixture was kneaded through a double roll, and then the kneaded product was subjected to press vulcanization at 160° C. for 30 minutes and then to oven vulcanization at 200° C. for 24 hours. The thus obtained vulcanization product was subjected to determination of physical properties.

EXAMPLE 4

172 g of filler-containing powder (regenerated fluorine rubber D compound) was obtained in the same manner as in Example 2, except that filler-containing, vulcanized vinylidene fluoride-hexafluoropropene-bromodifluoroethane terpolymer rubber cross-linked with a peroxide-based cross-linking agent was used in place of the filler-containing, vulcanized vinylidene fluoride-hexafluoropropene copolymer rubber cross-linked with a polyol-based cross-linking agent.

To 20 parts of the thus obtained regenerated fluorine rubber D compound were added the following components:

| | |
|---|---|
| Vinylidene fluoride-hexafluoropropene-bromodifluoroethane terpolymer rubber | 100 parts |
| MT carbon black | 30 parts |
| Triallyl isocyanurate (60%) | 5.7 parts |
| 2,5-dimethyl-2,5-(di-tert-butylperoxy)-hexane (60%) | 4 parts |
| Lead oxide | 5.7 parts |

The mixture was kneaded through a double roll, and then the kneaded product was subjected to press vulcanization at 180° C. for 15 minutes and then to oven vulcanization at 200° C. for 24 hours. The thus obtained vulcanization product was subjected to determination of physical properties.

EXAMPLE 5

145 g of filler-containing powder (regenerated fluorine rubber E compound) was obtained in the same manner as in Example 2, except that filler-containing, vulcanized tetrafluoroethylene-perfluoro(methyl vinyl ether) copolymer rubber, cross-linked with a peroxide-based cross-linking agent was used in place of the filler-containing, vulcanized vinylidene fluoride-hexafluoropropene copolymer rubber cross-linked with a polyol-based cross-linking agent.

To 20 parts of the thus obtained regenerated fluorine rubber E compound were added the following components:

| Tetrafluoroethylene-perfluoro (methyl vinyl ether) copolymer rubber | 100 parts |
|---|---|
| MT carbon black | 25 parts |
| Triallyl isocyanurate (60%) | 4 parts |
| 2,5-dimethyl-2,5-(di-tert-butylperoxy)-hexane (60%) | 2.5 parts |
| Lead oxide | 3.5 parts |

The mixture was kneaded through a double roll, and then the kneaded product was subjected to press vulcanization at 180° C. for 15 minutes and then to oven vulcanization at 200° C. for 24 hours. The thus obtained vulcanization product was subjected to determination of physical properties.

Results of determination in Examples 1 to 5 are shown in the following Table 1, where the figures in parentheses are measurements of virgin fluorine rubber containing no such regenerated fluorine rubber.

TABLE 1

| Ex. No. | Hardness (JIS A) | Tensile strength (kgf/cm$^2$) | Elongation (%) |
|---|---|---|---|
| 1 | 77 (75) | 160 (170) | 280 (330) |
| 2 | 76 (75) | 160 (170) | 290 (330) |
| 3 | 75 (75) | 130 (135) | 300 (320) |
| 4 | 69 (67) | 175 (200) | 310 (340) |
| 5 | 81 (82) | 205 (220) | 235 (200) |

EXAMPLE 6

200 g of filler-containing, vulcanized vinylidene fluoride-hexafluoropropene copolymer rubber cross-linked with a polyol-cross-linking agent and 1,800 g of CF$_3$SO$_3$H were placed in a flask and stirred for 18 hours, while maintaining the inside temperature at 90° C.. Then, 75 g of dark brown regenerated flourine rubber F was obtained by successive treatments in the manner as in Example 1.

To 20 parts of the thus obtained regenerated fluorine rubber F were added the following components:

| Vinylidene fluoride-hexafluoropropene copolymer rubber | 80 parts |
|---|---|
| MT carbon black | 20 parts |
| 2,2-bis(4-hydroxyphenyl)hexafluoropropane (50%) | 4 parts |
| Benzyltriphenylphosphonium chloride (35%) | 1 parts |
| Magnesium oxide | 3 parts |
| Calcium hydroxide | 6 parts |

Then, the mixture was subjected to kneading and then vulcanization, and determination of physical properties of vulcanization product in the same manner as in Example 1.

EXAMPLE 7

72 g of dark brown regenerated fluorine rubber G was obtained in the same manner as in Example 6, except that filler-containing, vulcanized vinylidene fluoride-hexafluoropropene-bromodifluoroethane terpolymer rubber cross-linked with a peroxide-based cross-linking agent was used in place of the filler-containing, vulcanized vinylidene fluoride-hexafluoropropene copolymer rubber cross-linked with a polyol-based cross-linking agent.

To 20 parts of the thus obtained regenerated fluorine rubber G were added the following components:

| Vinylidene fluoride-hexafluoropropene-bromodifluoroethane terpolymer rubber | 80 parts |
|---|---|
| MT carbon black | 25 parts |
| 2,2-bis(4-hydroxyphenyl)hexafluoropropane (50%) | 4 parts |
| Benzyltriphenylphosphonium chloride (35%) | 1 parts |
| Magnesium oxide | 3 parts |
| Calcium hydroxide | 6 parts |

The mixture was subjected to kneading and then vulcanization, and determination of physical properties of vulcanization product in the same manner as in Example 1.

EXAMPLE 8

80 g of dark brown regenerated fluorine rubber H was obtained in the same manner as in Example 6, except that filler-containing, vulcanized vinylidene fluoride-tetrafluoroethylene-perfluoro(methyl vinyl ether) terpolymer rubber cross-linked with a peroxide-based cross-linking agent was used in place of the filler-containing, vulcanized vinylidene fluoride-hexafluoropropene copolymer rubber cross-linked with a polyol-based cross-linking agent.

To 20 parts of the thus obtained regenerated fluorine rubber H were added the following components:

| Vinylidene fluoride-tetrafluoroethylene-perfluoro(methyl vinyl ether) terpolymer rubber | 80 parts |
|---|---|
| MT carbon black | 30 parts |
| Triallyl isocyanurate (60%) | 10 parts |
| 2,5-dimethyl-2,5-di(tert-butylperoxy)-hexane (40%) | 2 parts |
| Lead oxide | 6 parts |

The mixture was subjected to kneading and then vulcanization (where conditions for the press vulcanization were changed to 160° C. for 20 minutes and conditions for the oven vulcanization to 180° C. for 4 hours), and determination of physical properties of vulcanization product in the same manner as in Example 1.

EXAMPLE 9

69 g of dark brown regenerated fluorine rubber I was obtained in the same manner as in Example 6, except that filler-containing, vulcanized tetrafluoroethylene-propylene copolymer rubber (Aflas-100H, trademark of a product of Asahi Glass Co., Ltd, as vulcanized) cross-linked with a peroxide-based cross-linking agent was used in place of the filler-containing, vulcanized vinylidene fluoride-hexafluoropropene copolymer rubber cross-linked with a polyol-based cross-linking agent.

To 20 parts of the thus obtained regenerated fluorine rubber I were added the following components:

| Tetrafluoroethylene-propylene copolymer rubber | 80 parts |
|---|---|
| MT carbon black | 20 parts |
| Triallyl isocyanurate (60%) | 5 parts |
| α,α'-bis(tert-butylperoxy-m-isopropyl)-benzene (40%) | 1 parts |

The mixture was subjected to kneading and then vulcanization (where conditions for the press vulcanization were changed to 170° C. for 20 minutes and conditions for the oven vulcanization to 200° C. for 4 hours), and determination of physical properties of vulcanization product in the same manner as in Example 1.

EXAMPLE 10

200 g of filler-containing, vulcanized vinylidene fluoride-hexafluoropropene copolymer rubber cross-linked with an amine-based cross-linking agent, 200 g of $CF_3SO_3H$ and 1,600 g of $CH_3SO_3H$ were placed in a flask and stirred for 18 hours, while maintaining the inside temperature at 90° C. The resulting liquid slurry dispersion was added to water, and the resulting precipitate was dried and then treated in the same manner as in Example 1, whereby 92 g of dark brown regenerated fluorine rubber J was obtained.

To 20 parts of the thus obtained regenerated fluorine rubber J were added the following components:

| | |
|---|---|
| Vinylidene fluoride-hexafluoropropene copolymer rubber | 80 parts |
| MT carbon black | 25 parts |
| Hexamethylenediamine carbamate | 1.5 parts |
| Lead oxide | 15 parts |
| Dibasic lead phosphite | 5 parts |

The mixture was then subjected to kneading and then vulcanization (where only conditions for the press vulcanization were changed to 160° C. for 30 minutes), and determination of physical properties of vulcanization product in the same manner as in Example 1.

Results of determination in Examples 6 to 10 are shown in the following Table 2, where the figures in parentheses are measurements of virgin fluorine rubber containing no such regenerated fluorine rubber.

TABLE 2

| Ex. No. | Hardness (JIS A) | Tensile strength (kgf/cm$^2$) | Elongation (%) |
|---|---|---|---|
| 6 | 76 (75) | 160 (170) | 300 (330) |
| 7 | 75 (75) | 160 (135) | 300 (320) |
| 8 | 69 (67) | 140 (135) | 230 (250) |
| 9 | 72 (71) | 190 (190) | 330 (350) |
| 10 | 75 (75) | 130 (135) | 310 (320) |

What is claimed is:

1. A process for regenerating cross-linked, vulcanized fluorine rubber, which comprises treating cross-linked, vulcanized fluorine rubber with $CH_3SO_3H$, $ClSO_3H$, $CF_3SO_3H$ or fuming sulfuric acid, and recovering the treated fluorine rubber as revulcanizable fluorine rubber.

2. A process according to claim 1, wherein the treatment is carried out with $CH_3SO_3H$, $ClSO_3H$, $CF_3SO_3H$ or fuming sulfuric acid at a temperature of about 50° to about 200° C. with stirring.

3. A process according to claim 1, wherein the treatment is carried out with $CH_3SO_3H$, $ClSO_3H$, $CF_3SO_3H$ or fuming sulfuric acid in a solvent capable of swelling the cross-linked, vulcanizable fluorine rubber.

4. A process according to claim 3, wherein the solvent capable of swelling the cross-linked, vulcanized fluorine rubber is ketones, amides, sulfur-containing compounds, alcohols, lower fatty acids, esters or halogen-containing compounds.

5. A fluorine rubber composition for vulcanization-molding, which comprises a virgin fluorine rubber and about 5 to about 40% by weight on the basis of the virgin rubber of revulcanizable fluorine rubber recovered according to the process of claim 1.

6. A process according to claim 1, wherein the cross-linked, vulcanized fluorine rubber is filler-containing, vulcanized fluorine rubber and the treated fluorine rubber is recovered as filler-containing, revulcanizable fluorine rubber.

7. A fluorine rubber composition for vulcanization-molding, which comprises a virgin fluorine rubber and about 5 to about 40% by weight in terms of rubber moiety on the basis of the virgin rubber of the filler-containing, revulcanizable fluorine rubber recovered according to the process of claim 6.

8. A process for regenerating cross-linked, vulcanized fluorine rubber, which comprises treating filler-containing, cross-linked, vulcanized fluorine rubber with $CH_3SO_3H$, $ClSO_3H$, $CF_3SO_3H$ or fuming sulfuric acid, dissolving the treated fluorine rubber into a fluorine rubber-soluble solvent, separating solvent-insoluble filler from the fluorine-containing-rubber solution and recovering residual treated fluorine rubber as revulcanizable fluorine rubber.

9. A process according to claim 8, wherein the treatment is carried out with $CH_3SO_3H$, $ClSO_3H$, $CF_3SO_3H$ or fuming sulfuric acid at a temperature of about 50° to about 200° C. with stirring.

10. A process according to claim 8, wherein the treatment is carried out with $CH_3SO_3H$, $ClSO_3H$, $CF_3SO_3H$ or fuming sulfuric acid and treated filler-containing fluorine rubber is recovered by filtration, washed with water and dried, and dissolved into the fluorine rubber-soluble solvent.

11. A fluorine rubber composition for vulcanization-molding, which comprises a virgin fluorine rubber and about 5 to about 40% by weight in terms of rubber moiety on the basis of the virgin rubber of revulcanizable fluorine rubber recovered according to the process of claim 8.

* * * * *